United States Patent
Almstead

[15] 3,705,763
[45] Dec. 12, 1972

[54] DISENGAGEABLE ANTI-BACKUP MECHANISM FOR A FILM CARTRIDGE

[72] Inventor: James L. Almstead, Rochester, N.Y.

[73] Assignee: Eastman Kodak Company, Rochester, N.Y.

[22] Filed: May 7, 1971

[21] Appl. No.: 141,324

[52] U.S. Cl................352/78 R, 242/194, 352/221, 352/230
[51] Int. Cl........................G03b 23/06, G03b 27/62
[58] Field of Search........352/72, 78 R, 91, 156, 221, 352/230; 242/194, 197, 198

[56] References Cited

UNITED STATES PATENTS

| | | | |
|---|---|---|---|
| 3,623,679 | 11/1971 | Neudecker | 242/194 |
| 3,043,187 | 7/1962 | Shaffer | 352/72 |

*Primary Examiner*—John M. Horan
*Assistant Examiner*—Fred L. Braun
*Attorney*—William H. J. Kline and G. Herman Childress

[57] ABSTRACT

A film cartridge includes an anti-backup mechanism for preventing rotation of the take-up spool when the cartridge is out of a camera and the mechanism is disengageable for permitting rotation of the take-up spool when the cartridge is loaded in the camera. In a preferred embodiment, the mechanism comprises a latching member having a detent portion and mounted for movement transverse to the axis of rotation of the spool between a first, engaged position wherein the detent portion engages the spool to prevent rotation thereof, and a second, disengaged position wherein the detent portion is disengaged from the spool to permit rotation thereof. The latching member is secured to a spring which is actuated through an exposure aperture in the cartridge by a camera member so that if the camera has a reversible film drive, "fade and lap dissolve" photographic sequences are possible.

6 Claims, 5 Drawing Figures

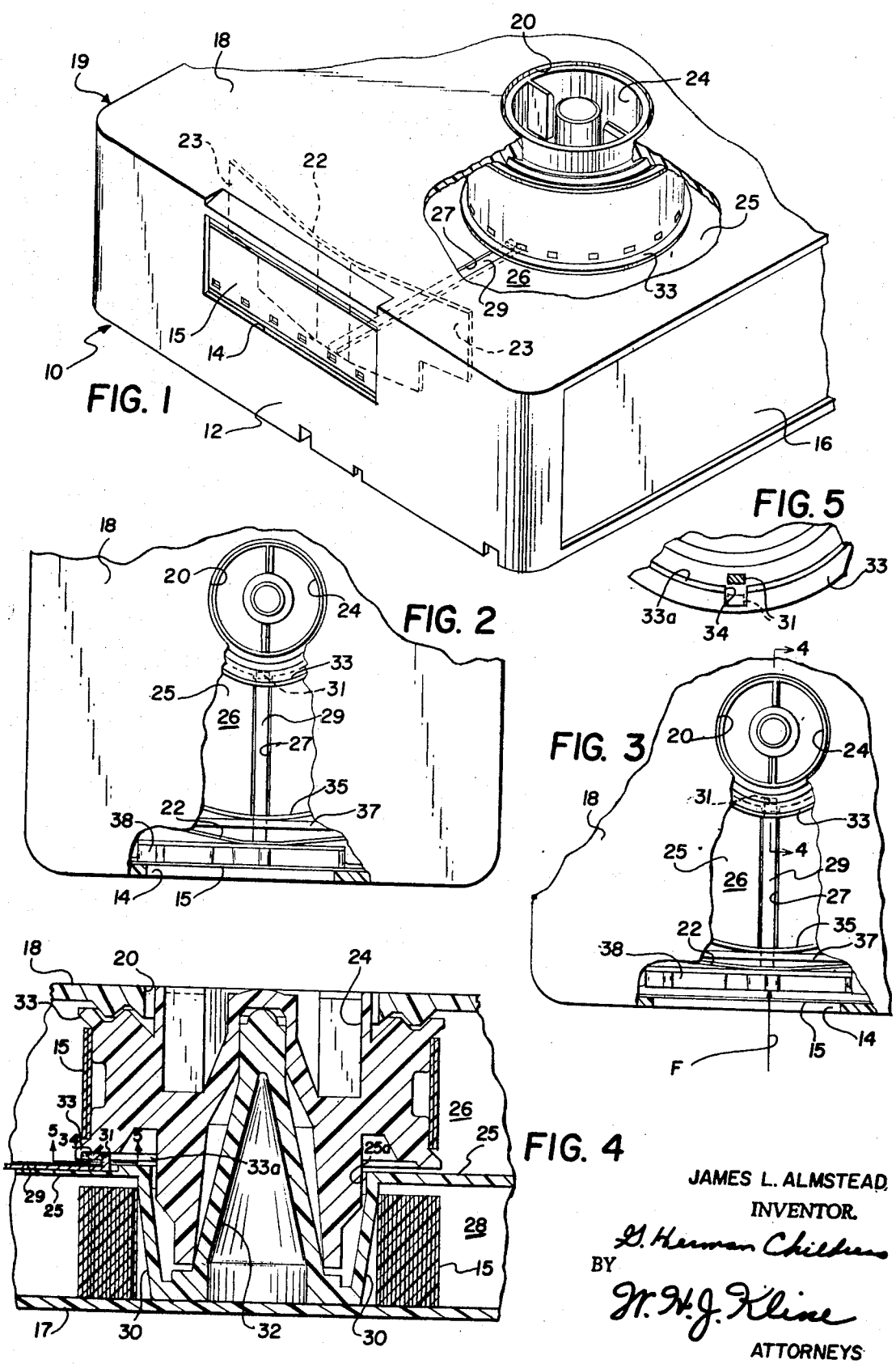
PATENTED DEC 12 1972
3,705,763
JAMES L. ALMSTEAD,
INVENTOR.

DISENGAGEABLE ANTI-BACKUP MECHANISM FOR A FILM CARTRIDGE

BACKGROUND OF THE INVENTION

1. Field of the invention

This invention relates generally to film cartridges. More specifically, the invention relates to a cartridge for movie cameras wherein a cartridge take-up spool is rotatable about its axis in a take-up direction and an unwinding direction when the cartridge is properly loaded in a camera and wherein the take-up spool is locked against rotation when the cartridge is out of the camera. The cartridge of the invention can be loaded with 8mm. motion picture film, for example.

2. Description of the Prior Art

Film cartridges for motion picture cameras are well known in the art. For example, commonly assigned U.S. Pat. No. 3,208,685 entitled "Anti-Friction Disk for Strip Material," issued Sept. 28, 1965 in the manes of E. A. Edwards and A.J. Tucker and U.S. Pat. 3,208,686 entitled "Film Cartridge," issued Sept. 28, 1965 in the names of Edwards Munson and Black disclose film cartridges that are generally commercially available. During operation of a camera containing such a cartridge, a roll of film in a supply chamber of the cartridge is first advanced past an exposure aperture in the cartridge for exposure to scene light by operation of the camera, and then wound onto a spool in a take-up chamber. If a film cartridge is subjected to rough handling while outside the camera, the roll of film contained therein may clockspring. The term "clock-spring" as used herein means the radial displacement of successive outer convolutions of the roll of film relative to the central axis thereof, caused by the tendency of the coiled film to unwind.

The film has a tendency to clockspring when coiled in either the film supply chamber or the film take-up chamber. When the film slidably engages the walls of these chambers, friction forces can become excessive during movement of the film with respect to walls, resulting in unsteady film registration in the film exposure aperture, overall erratic cartridge operation or even total failure of the cartridge.

Commercially available cartridges of the type disclosed in the before-mentioned patents include within the take-up chamber a shuttle or anti-backup device that prohibits the take-up spool from rotating in a reverse or unwinding direction so that the coiled film cannot unwind. Although this device solves the "clock-spring" problem in the take-up chamber, it also prevents the photographing of double exposure or "fade and lap dissolve" sequences.

To photograph "fade and lap dissolve" sequences it is necessary first to expose a number of frames in the forward direction as the exposure aperture is gradually reduced. These exposed frames must then be driven in the reverse direction to enable the camera operator to expose the frames a second time as the exposure aperture is gradually increased. This double exposure of the film under varying aperture size conditions comprises a "fade and lap dissolve" sequence.

Thus there are conflicting requirements in order to photograph "fade, lap and dissolve" sequences yet protect against film "clock-springing" since the former requires a reverse film drive operation and the latter requires inhibiting reverse take-up spool rotation.

The "related applications" referred to hereinbefore disclose film cartridges with anti-backup devices to prevent "clockspringing" which can be disabled selectively by a camera mechanism to permit "fade, lap and dissolve" camera operation. Such cartridges comprise a conventional shuttle mounted in the cartridge for movement transverse to the axis of rotation of the spool, and a member mounted on the hub of the take-up spool and movable axially by the camera mechanism for selectively disengaging the shuttle. When the cartridge is out of the camera the shuttle prevents reverse spool rotation. Although this arrangement provides capability to photograph "fade, lap and dissolve" sequences while protecting against "clockspringing" of the take-up roll of film it requires modification of the camera and the addition of parts to the standard movie film cartridge structure, thereby increasing cost of the camera and the cartridge. In addition, it has been found that in severe handling of the cartridge the shuttle contained therein may fail.

SUMMARY OF THE INVENTION

One of the objects of the present invention is to provide a film cartridge having an improved anti-backup mechanism.

A still further object of this invention is to provide a film cartridge having an anti-backup mechanism which is disabled automatically when such a cartridge is loaded into a movie camera.

A still further object of this invention is to provide a film cartridge having an anti-backup mechanism which will prevent the take-up spool from rotating in either direction when such a cartridge is out of the camera.

Another object of this invention is to provide a film cartridge having an anti-backup mechanism of the type described above which can be used in combination with a movie camera without requiring modification to such a camera.

Still another object of the invention is to provide a cartridge having an improved anti-backup mechanism in which such a cartridge is of simple design and construction and economical to manufacture.

A further object of the invention is to provide a film cartridge of the type referred to herein which eliminates the need for the shuttle usually provided with such cartridges.

In accordance with the present invention, a film cartridge comprises a rotatably mounted take-up spool with at least one indentation thereon, and a latching member having a detent portion, the member being mounted for movement between a first position wherein the detent portion engages the indentation on the spool to prevent rotation thereof and a second position wherein the detent portion is disengaged from the spool to permit rotation thereof. Preferably, the latching member has a further portion which senses when the cartridge is loaded into a camera so that when the cartridge is in a camera the latching member is disabled automatically, and when the cartridge is out of the camera the member is returned to the latching position.

In the preferred embodiment, the latching member is actuated through the exposure aperture of the cartridge by a camera member when the cartridge is properly loaded in the camera so that if the camera has a reversible film drive, "fade, lap and dissolve" sequences are possible.

BRIEF DESCRIPTION OF THE DRAWINGS

FIG. 1 is a perspective view of a portion of a film cartridge according to the invention showing the take-up side of the cartridge with a portion of a sidewall cut away to better illustrate portions of the take-up spool and anti-backup mechanism according to the present invention;

FIG. 2 is a plan view of a portion of the cartridge showing the take-up side of the cartridge with a portion of the sidewall cut away to show the anti-backup mechanism according to the invention, in the engaged position;

FIG. 3 is a view of a portion of the cartridge, similar to FIG. 2, but showing the anti-backup mechanism disengaged, such as occurs in response to loading of the cartridge into a camera;

FIG. 4 is an enlarged cross-sectional view of a portion of the cartridge taken along line 4—4 in FIG. 3; and FIG. 5 is an enlarged, fragmentary view taken along the line 5—5 in FIG. 4.

DESCRIPTION OF THE PREFERRED EMBODIMENT

Because the combination of a motion picture camera and a film cartridge is well known, the present description will be directed in particular to elements forming part of, or cooperating more directly with apparatus in accordance with the present invention. It is to be understood that elements not specifically shown or described may take various forms well known to those skilled in the art.

The present invention relates to a modification of cartridges such as disclosed in the before-mentioned U.S. Pat. Nos. 3,208,685 and 3,208,686. Accordingly, the following description is limited to those structures relating to the present invention, reference being made to such patents for other features of the cartridges.

There is shown in FIG. 1 of the drawings a portion of a film cartridge 10 having a frontwall 12 defining an exposure aperture 14, past which a strip of film 15 is guided for exposure. The cartridge has spaced, parallel sidewalls 17 and 18. Sidewall 18 has an aperture 20 for receiving part of a film take-up spool 24. The sidewalls 17, 18 and an edgewall 16 cooperate with frontwall 12 and other walls (not shown) to form a light-tight housing 19. Cartridge 10 includes an internal partition 25 which cooperates with sidewalls 17 and 18 to define a take-up chamber 26 and a film supply chamber 28 (FIG. 4). Located in the side of partition 25 facing the take-up chamber is an elongate depression, recess or groove 27 extending substantially perpendicular to the plane of frontwall 12 from the edge of the partition nearest wall 12 toward the axis of take-up spool 24.

Illustrated by the dash lines of FIG. 1, but more clearly seen in FIGS. 2 and 3, is a leaf spring 22 interposed between aperture 14 and spool 24. Secured to the base of spring 22 is a latching member comprising a wire having an elongate shank portion slidably disposed in groove 27 and a detent portion 31 projecting out of the groove toward wall 18 in a direction perpendicular to wall 18 and parallel to the axis of rotation of the spool. The term "wire" as used herein is intended to mean any elongate element having a relatively rigid characteristic. Preferably, groove 27 is of sufficient depth and wire 29 is sufficiently thin so that the wire does not protrude into chamber 26 where it might interfere with the winding of film onto spool 24.

Interposed between spring 22 and film 15 is a pressure pad 38 mounted for movement transverse to the plane of the film. Disposed within housing 19 is a peripheral wall 35 defining the outer diameter of chamber 26. Tabbed end portions 23 of spring 22 are secured to a rigid member 37 passing tangentially to wall 35 so that the center portion of the spring engages and biases the inside surface of a flange on spool 24. The various parts are in the position illustrated in FIG. 2 when cartridge 10 is out of a camera (not shown). When the cartridge is properly loaded into a camera, the exposure aperture 14 in front wall 12 will be positioned with respect to a camera lens system (not shown) so that the film can be exposed through aperture 14. A mechanism (not shown) in the camera can engage the film through aperture 14 for driving the film past the aperture in an intermittent manner. Another camera drive mechanism frictionally drives spool 24 in a take-up direction and thereby avoids clock-springing of the film in the cartridge take-up chamber while the cartridge is loaded in a camera. As the cartridge is loaded into a camera, pressure pad 38 and spring 22 are depressed toward the take-up spool 24 by a part of the camera that enters aperture 14, and this moves detent portion 31 to disengage it from the spool. This is illustrated in FIG. 3, where the force vector F diagrammatically represents the force exerted by the part of the camera.

As seen in FIG. 4, positioned in supply chamber 28 is a hub or boss 30 formed integral with partition 25. A supply roll of film 15 is positioned loosely around the boss. Integral with boss 30 is a post 32 that extends through an aperture 25a in the center portion of partition 25 and into take-up chamber 26. Spool 24 is mounted for rotation on the end of post 32, and it receives film 15 after the film passes exposure aperture 14. For a more detailed description of the threading path for film from the film supply chamber to the film take-up chamber reference is made to the before-mentioned U.S. Pat. No. 3,208,686 issued to Edwards et al.

Spool 24 has beveled flanges 33 which prevent lateral film wander and permit a level wind-up of the film free from contact with sidewall 18 and partition 25. An inner surface 33a of the flange 33 adjacent partition 25 has at least one rectangular-shaped indentation, notch or recess 34 which opens radially inwardly for receiving detent portion 31 of wire 29 when spring 22 is not depressed by the camera and the indentation is aligned with groove 27 as shown in FIG. 2. Indentation 34 is most clearly shown in FIG. 5. Although the drawings illustrate only one indentation, it is understood that a plurality of such indentations can be provided and distributed about the inner surface 33a of the flange (or in other portions of the spool) so that one of the indentations becomes aligned with groove 27 following a minimal rotation of the spool.

Thus, an anti-backup mechanism according to the preferred disclosed embodiment comprises a latching mechanism including wire 29 secured at one end to spring 22 and guided by groove 27 for movement transverse to the axis of rotation of take-up spool for engaging an disengaging detent portion 31 relative to indentation 34. When detent portion 31 of the wire is received in indentation 34, spool 24 is prevented from rotating in either direction, and when the detent is disengaged from the indentation, the spool is permitted to rotate in either direction.

The anti-backup mechanism of the cartridge 10 is disengaged when pressure pad 38 depresses spring 22 radially inward as occurs, for example, when the cartridge is inserted into a conventional motion picture camera. When this happens, spring 22 to which wire 29 is secured moves radially inward thereby causing detent 31 to move out of indentation 34. This is shown in FIGS. 3–5.

A camera mechanism for depressing a pressure pad of a cartridge when operatively positioned in a camera is shown diagrammatically by the force vector denoted F in FIG. 3 with the anti-backup mechanism disabled to enable an operator to photograph overlapping "fade and lap dissolve" sequences. The camera can include a reversible film drive and an exposure control mechanism for gradually varying exposure conditions during a "fade, lap and dissolve" sequence. Since these camera elements are well known in the art, they need not be described in detail herein.

When cartridge 10 is properly loaded in the camera, exposure aperture 14 is positioned in alignment with a lens system of the camera. Most commercially available movie cameras, when loaded with a film cartridge, include the capability for insuring that film 15 is biased into the correct exposure plane. To effect this result, means (such as lugs, rails or posts) are provided on the camera to engage and depress pressure pad 38 (as shown in FIG. 3) in opposition to the bias force of spring 22 transversely toward spool 24 so that film 15 can be held in the proper plane as it is advanced past exposure aperture 14. With pad 38 depressed, spring 22 flexes inwardly, causing detent portion 31 of wire 29 to be disengaged from indentation 34, thereby freeing spool 24 for rotation in either direction.

When cartridge 10 is removed from the camera, spring 22 will flex outwardly and urge detent portion 31 toward surface 33a and into the indentation 34, thereby holding the spool against rotation and avoiding clockspringing. In the event one of the indentations 34 is not aligned with groove 27 when cartridge 10 is removed from the camera, spool 24 can be rotated manually until this alignment occurs. However, manual rotation normally is not necessary since clockspringing of the film is accompanied by rotation of the spool 24, and this automatically effects seating of the wire in indentation 34 before excessive clockspringing occurs.

The wire can be coupled directly to spring 22 (as illustrated) or directly to the pressure pad 38, or indirectly coupled to either of them or other member that are movable in a manner for effecting improvement of the wire. The latching mechanism of the invention is actuated without requiring special camera mechanisms or operations since spring 22 normally is depressed automatically in response to loading a cartridge into a camera. An additional advantage of the mechanism of the preferred embodiment is that "fade and lap dissolve" operation is possible with relatively minor modifications to conventional film cartridges. That is, by securing a wire having a detent portion to the leaf spring, providing a groove in the cartridge partition in which the wire can travel, and an indentation in the take-up spool, rotation is possible while the cartridge is loaded in the camera and prevented when the cartridge is out of the camera. Such modification is economical, especially since the invention eliminates the anti-backup disk normally used in conventional film cartridges of this type. Of course, clock-springing of film is avoided when the cartridge is out of a camera and detent 31 is in indentation 34. Therefore, the cartridge also is suitable for general purpose use, i.e., for use in cameras not provided with means for effecting fade and lap dissolve. In this regard, it should be noted the clockspringing is a problem when the cartridge is outside the camera and thus disengaged from the friction drive in the camera that is used for turning the cartridge take-up spool. Thus a cartridge of this invention affords the same protection against clockspringing as conventional cartridges of this type. Because the anti-backup mechanism of the invention is operative to prevent clockspringing of the film only when the cartridge is out of the camera, it is very suitable for use in cameras where sound is to be recorded on a sound track on the film while a scene is being photographed since conventional anti-backup mechanisms make some noise during operation, and such noise may be sufficiently loud to be picked up by a sensitive recording device.

The invention has been described in detail with particular reference to preferred embodiments thereof, but it will be understood that variations and modifications can be effected within the spirit and scope of the invention.

I claim:

1. In a cartridge for receiving an elongate strip of light-sensitive material, said cartridge having means defining an aperture for exposing said material to light from a scene, and means for biasing said strip toward said aperture, the improvement comprising:

a. a spool rotatably mounted within said cartridge for rotation about an axis, the spool being adapted to receive and wind thereon said strip of material; and b. a latching member mounted on the cartridge for movement in a direction transverse to the axis of rotation of the spool between a first position wherein a first portion of said member engages said spool for securing said spool against rotation and a second position wherein said first portion of said member is disengaged from said spool to permit rotation of said spool, said latching member having a second portion disposed in the cartridge with respect to said biasing means so that a force exerted on said biasing means in a direction opposite the biasing force effects a movement of said latching member from its first position to its second position.

2. In a cartridge for receiving an elongate strip of film, said cartridge having means defining an exposure aperture across which said strip of film is guided for exposure, and means for biasing said film within said aperture, the improvement comprising:

a. means defining a chamber within said cartridge, said chamber defining means having a recess extending from said film biasing means toward the interior of said cartridge;

b. a take-up spool positioned within said chamber for receiving thereon said strip of film, said spool being mounted for rotation about an axis and having at least one indentation located on a surface thereof; and
c. a latching member slidable along said recess between a first position wherein a first portion of said member occupies said at least one indentation of said spool for securing said spool against rotation and a second position wherein said first portion of said member is removed from said at least one indentation of said spool to permit rotation of said spool, said latching member having a second portion mounted on said biasing means so that a force exerted on said biasing means in a direction opposite the biasing force effects movement of said latching member from its first position to its second position.

3. In a cartridge as set forth in claim 4 wherein said at least one indentation is on a radially inner surface of the spool, and said first portion of said latching member comprises a detent projecting from said recess in said chamber defining means, said detent being substantially parallel to the axis of rotation of said spool.

4. In a motion picture cartridge having means defining an aperture for exposing film in the cartridge, means defining a chamber for film within said cartridge, a film spool mounted within said chamber for rotation in either a take-up or an unwinding direction about an axis, and means for biasing said film toward said exposure defining means, the improvement comprising:

means for latching said spool against rotation in either a take-up or an unwinding direction, the latching means comprising (1) means on said spool defining a latching surface and (2) a latching member movable within the cartridge between a first position wherein a first portion of said member is located with respect to said latching surface on said spool for preventing rotation of said spool and a second position wherein said first portion of said member is located with respect to said surface on said spool to permit rotation of said spool in either a take-up or an unwinding direction, said latching member having a second portion secured to said film biasing means, and means carried by said cartridge and coupled to said latching member for guiding movement of said latching member between its first and second positions.

5. In a motion picture film cartridge as set forth in claim 4 wherein said guiding means comprises a groove in said chamber defining means, and said latching surface on said spool comprises an indentation on a radially inner surface of the spool.

6. In a motion picture film cartridge as set forth in claim 5 wherein said latching member comprises a wire member having a shank portion positioned within said groove and a detent portion projecting out of said groove and positionable within said indentation when said latching member is in its first position.

* * * * *